United States Patent
Kajita et al.

(10) Patent No.: US 6,672,813 B1
(45) Date of Patent: Jan. 6, 2004

(54) TAPPING SCREW

(75) Inventors: Hirohisa Kajita, Aichi (JP); Kazunori Kouketsu, Aichi (JP); Naoki Hoshino, Aichi (JP)

(73) Assignee: Aoyama Seisakusho Co., Ltd., Nagoya (JP)

( * ) Notice: Subject to any disclaimer, the term of this patent is extended or adjusted under 35 U.S.C. 154(b) by 0 days.

(21) Appl. No.: 10/019,168
(22) PCT Filed: Jun. 23, 2000
(86) PCT No.: PCT/JP00/04116
§ 371 (c)(1),
(2), (4) Date: Dec. 20, 2001
(87) PCT Pub. No.: WO01/01001
PCT Pub. Date: Jan. 4, 2001

(30) Foreign Application Priority Data

Jun. 28, 1999 (WO) ............................... PCT/JP99/03436

(51) Int. Cl.$^7$ .................................................. F16B 35/04
(52) U.S. Cl. ...................... 411/411; 411/414; 411/387.4
(58) Field of Search ............................. 411/386, 387.4, 411/411, 414, 417, 423; 606/73

(56) References Cited

U.S. PATENT DOCUMENTS

| | | | | |
|---|---|---|---|---|
| 4,842,467 A | * | 6/1989 | Armstrong | 411/399 |
| 4,943,094 A | * | 7/1990 | Simmons | 285/333 |
| 5,061,135 A | * | 10/1991 | Pritchard | 411/411 |
| 5,110,245 A | * | 5/1992 | Hiroyuki | 411/421 |
| 5,470,334 A | * | 11/1995 | Ross et al. | 606/72 |
| 5,544,993 A | * | 8/1996 | Harle | 411/414 |

FOREIGN PATENT DOCUMENTS

| | | | | |
|---|---|---|---|---|
| EP | 0 230 856 A1 | * | 8/1987 | 606/73 |
| JP | 55-4570 | | 2/1980 | |
| JP | 6-52083 B2 | | 7/1994 | |
| JP | 9-291918 A | | 11/1997 | |
| WO | WO 9300518 | * | 1/1993 | 411/310 |

OTHER PUBLICATIONS

English Language International Preliminary Examination Report dated Feb. 22, 2002, issued in counterpart International Application No. PCT/JP00/04116.

* cited by examiner

Primary Examiner—Flemming Saether
Assistant Examiner—Jori Schiffman
(74) Attorney, Agent, or Firm—Frishauf, Holtz, Goodman & Chick, P.C.

(57) ABSTRACT

The present invention is directed to provide a tapping screw for a soft material having a sufficiently large stripping torque compared to a driving torque and an increased tolerance of a fastening torque, and characterized in that it has threads each having a leading flank and a following flank, the leading flank being designed to be steeper than the following flank, that an R is imparted to a crest of each thread on the following flank side, that an R is also imparted to each flank at a portion contiguous to a root thereof and that the former R and the latter R being designed to connect smoothly to each other at the root.

4 Claims, 8 Drawing Sheets

Driving direction

Driving direction

Driving direction 18 threads/inch
40

Enlarged view of pertinent portion
(Present invention)

Enlarged view of pertinent portion
(Prior Art B)

Enlarged view of pertinent portion
(Prior Art A)

TAPPING SCREW

This application is a U.S. National Phase Application under 35 USC 371 of International Application PCT/JP00/04116 (not published in English) filed Jun. 23, 2000.

TECHNICAL FIELD

The present invention relates to a tapping screw used for a member produced from a soft material.

BACKGROUND ART

A tapping screw has been known to be used for a member produced from a soft material having low rigidity such as synthetic resins. The tapping screw having an included angle of 40 to 50° and longitudinal grooves formed on the threaded portion is disclosed in Japanese Utility Model Publication No. 4570/1980 by the same applicant of the present invention. This tapping screw disclosed is directed to achieving reduction in driving torque and improvement of holding strength under the interaction between the included angle and the longitudinal grooves on the threaded portion. It has long been utilized as a tapping screw for automobile application.

However, the tapping screw for a soft material involves a problem that it has an insufficient stripping torque as compared to a driving torque, wherein the former means the maximum torque limit without collapsing of an included thread formed in a material such that the screw becomes incapable of tightening, and the latter means the torque necessary for driving the tapping screw into the material. This problem results in a narrow tolerance of a tightening torque and also requires strict torque control so as to avoid such incapability of the screw in tightening thereof, leading to poor workability.

A tapping screw to be driven well into aerated concrete is disclosed in Japanese Patent Publication No. 52083/1994. However, this tapping screw cannot exhibit the desired performance of a sufficient stripping torque as compared to a driving torque.

DISCLOSURE OF THE INVENTION

The present invention is directed to solve the problems described above and to provide a tapping screw for a member produced from a soft material. The tapping screw of the present invention has a sufficiently large stripping torque as compared to a driving torque and an increased tolerance of a tightening torque. Here, the soft material includes a plate member produced from a soft material, such as a synthetic resin and a composite material thereof, as well as, aluminum, magnesium and alloys thereof.

The present invention relates to a tapping screw comprising threads each having a leading flank (hereinafter referred to as a first flank which faces in a driving direction of the screw) and a following flank at the opposite side (hereinafter referred to as a second flank which faces toward a head of the screw), wherein the former is designed to be steeper than the latter; an R being imparted to a crest of each thread and to the second flank side; an R being imparted also to each flank at a portion contiguous to a root thereof; and the former R and the latter R being designed to connect smoothly to each other at the root.

Here, each thread preferably has a leading flank angle ($\theta_1$) of 0 to 10°, a following flank angle ($\theta_2$) of 20 to 40° and an included angle ($\theta_1+\theta_2$) of 20 to 50°.

Further, the tapping screw may have longitudinal grooves on its threaded portion.

The expression "an R being imparted to . . . " in the present specification means to form each thread such that it has an arcuate cross section. More specifically, at the crest, it means to cut off the crest to form a convex arcuate section, while at the portion of the flank contiguous to the root thereof, it means to form a concave arcuate section in the first flank side to recede inwardly from the first flank (a cross-sectional profile of which is linear) of the conventional tapping screw, and it means to form an arcuate section in the second flank side to project roundly from the second flank (a cross-sectional profile of which is linear) of the conventional tapping screw.

This constitution can achieve both reduction in a driving torque and increase in a stripping torque, thus allow to increase the tolerance of a tightening torque.

Figure 1:
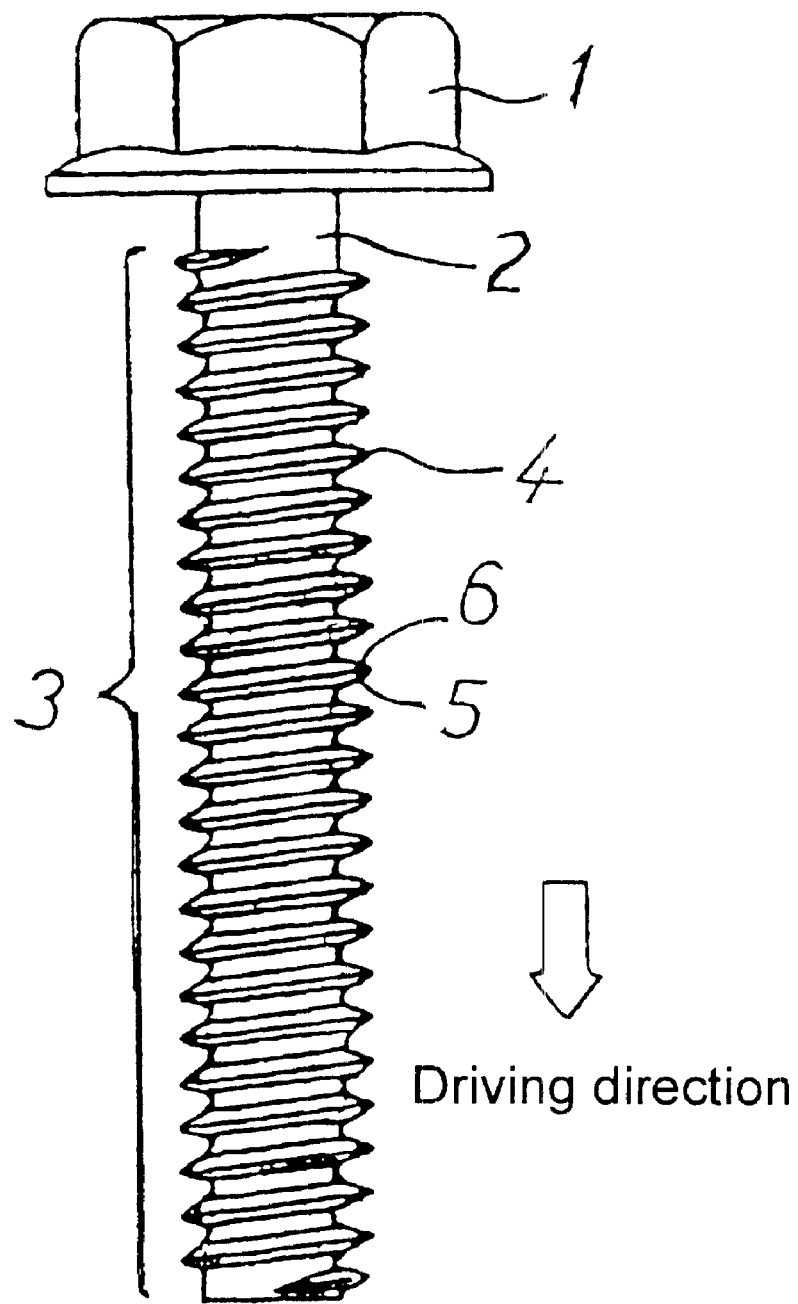
FIG. 1 is a side view showing an embodiment of a tapping screw according to the present invention.

Meanings of reference numerals are as follows:

1: head
2: body
3: threaded portion
4: thread
5: leading flank
6: following flank
7: crest of the thread
8: longitudinal groove

BEST MODE FOR CARRYING OUT THE INVENTION

The present invention will be described below more specifically referring to the drawings.

FIG. 1 shows a tapping screw according to a first embodiment of the present invention, and reference numerals 1, 2 and 3 denote a hexagon head, a body and a threaded portion respectively. The threaded portion 3 has a multiplicity of threads 4 formed thereon.

Figure 2:
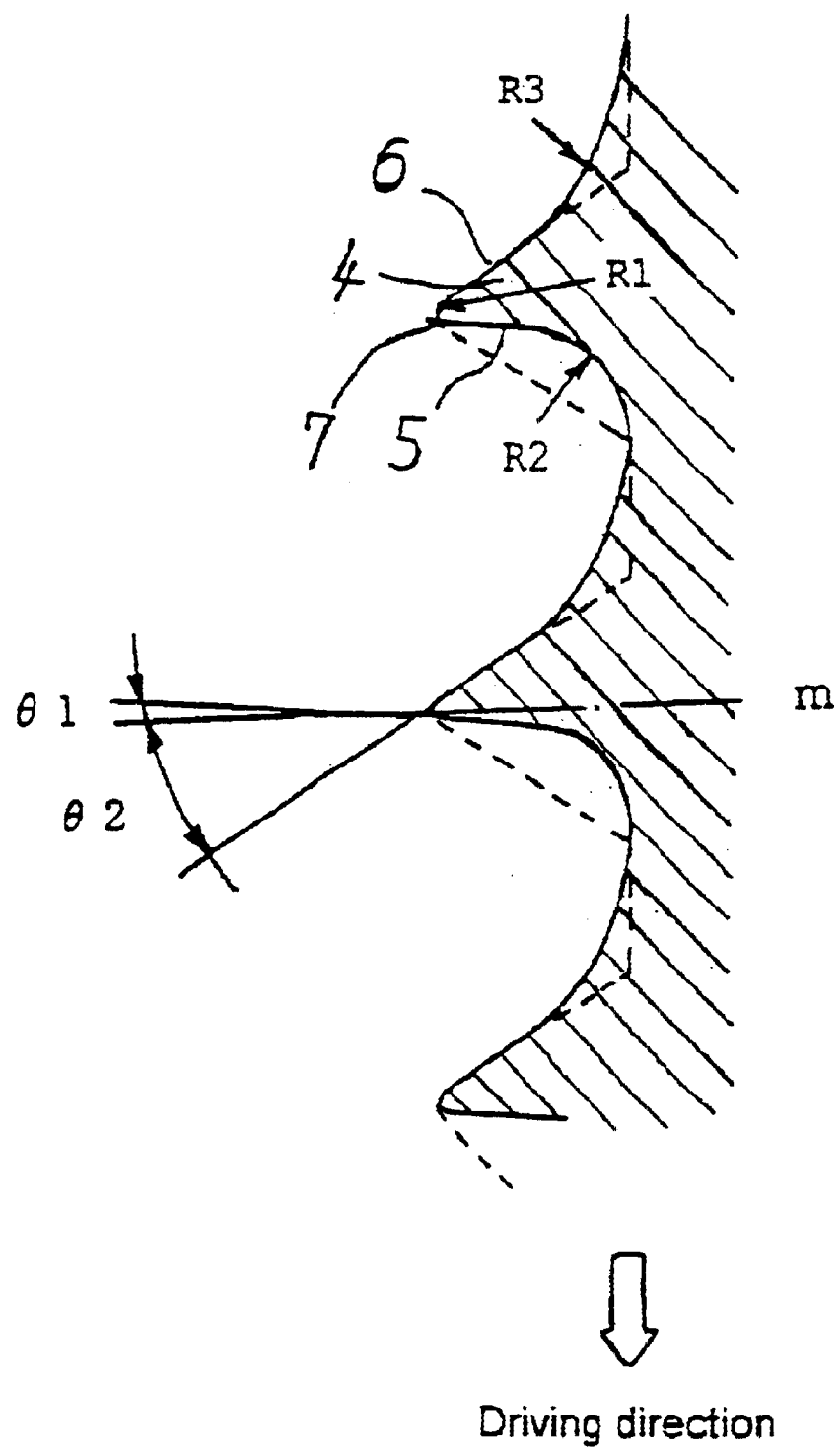
FIG. 2 is an enlarged cross-sectional view of threads in the tapping screw shown in FIG. 1.

FIG. 2 shows an enlarged cross-sectional view of threads in the tapping screw, wherein the cross-section profile is taken along the axial line of the screw, showing only a half thereof. In the figure, threads of a prior art tapping screw, which is disclosed in Japanese Utility Model Publication No. 4570/1980 (hereinafter referred to as "Prior Art C"), is indicated by the broken line. Each thread 4 has an asymmetrical cross-sectional profile where two flanks of each thread form different angles with the line passing the crest of the thread. The first flank 5 is designed to have a steeper gradient than in the second flank 6. In other words, the angle formed between the perpendicular line: m drawn from the crest 7 of each thread 4 toward the axial line and the second flank 6 (hereinafter referred to as "second flank angle: θ2") is designed to be greater than the angle formed between said line: m and the first flank 5 (hereinafter referred to as "first flank angle: θ1"). In this embodiment, the first flank angle (θ1) is 4° and the second flank angle (θ2) is 30°, so that the included angle amounts to 34°, which is smaller than that of the prior art. In the present invention, the first flank angle (θ1), second flank angle (θ2) and included angle (θ1+θ2) are preferably 0 to 10°, 20 to 40° and 20 to 50°, respectively.

A radius R1 is imparted to the crest of each thread 4 and to the second flank side so that it may form a gentle line connecting to the second flank as shown in FIG. 2. Incidentally, an M6 tapping screw has a thread height (H) of 0.8 mm, a thread pitch (P) of 1.4 mm and an R1 (radius of curvature) of 0.1 mm at the crest 7. Further, as shown in FIG. 2, radii R2 and R3 are imparted to the portion wherefrom each flank extends to the root. In an M6 tapping screw, R2 is 0.4 mm on the first flank side and R3 is 0.55 mm on the second flank side, and R2 and R3 are designed to form a continuous line in the root. Meanwhile in an M4 tapping screw, the crest, the first flank side and the second flank side have R1 of 0.07 mm, R2 of 0.3 mm and R3 of 0.4 mm, respectively.

In the tapping screw of the present invention having the constitution as described above, since the first flank 5 of each thread is designed to be steeper than the second flank 6, and since R1 is imparted to the crest 7 and R3 to the second flank side, the thickness of the threads 4 is thinner than those in the conventional screws. Therefore, when the tapping screw is driven into a soft material, the amount of scraping off of the soft material by the threads 4 is reduced compared with the prior art, resulting in reduction of the driving torque. Besides, the radius imparted to the portion of each flank contiguous to the root thereof provides a clearance or room for the soft material scraped off during driving of the screw. This also reduces the driving torque.

Figure 3:
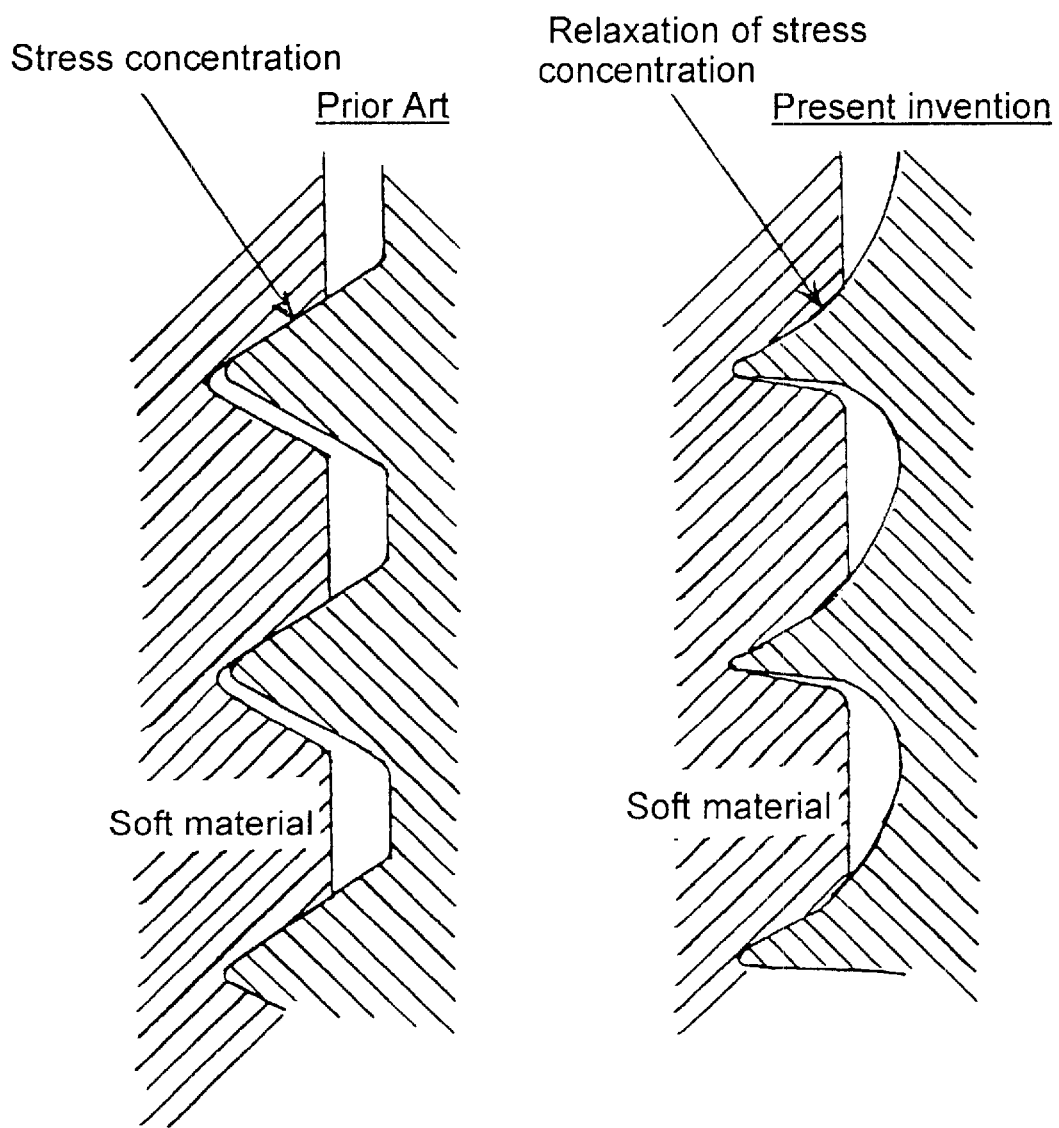
FIG. 3 is an enlarged cross-sectional view for explaining difference between the tapping screw of the present invention and that of a prior art tapping screw (Prior Art C) in terms of interaction between threads and a soft material member.

Meanwhile, since the reduction in thickness of the threads 4 as described above reduces the amount of the soft material to be scraped off, the strength of the internal thread formed in the soft material can be increased. In addition, the R3 imparted to the second flank of each thread 4 disperses the stress given by the threads 4 to the internal thread formed in the soft material, as shown in FIG. 3, leading to the relaxation of stress concentration. This increases the stripping torque.

As described above, in the tapping screw for a soft material according to the present invention, since the driving torque is reduce and, on the contrary, the stripping torque is increased compared with those of the prior art tapping screws, the tolerance of a fastening torque can be increased to improve workability drastically.

TEST EXAMPLE 1

Figure 4:
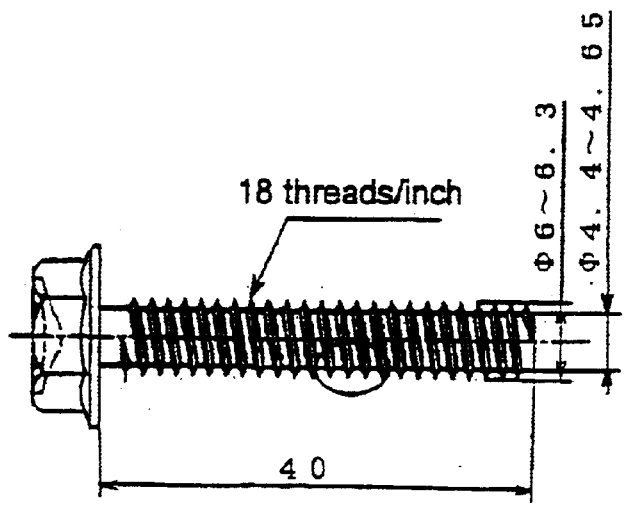
FIG. 4 is a side view of a tapping screw used for testing and enlarged cross-sectional views of threads of the present invention and of the prior art (Prior Art B)
Figure 4:
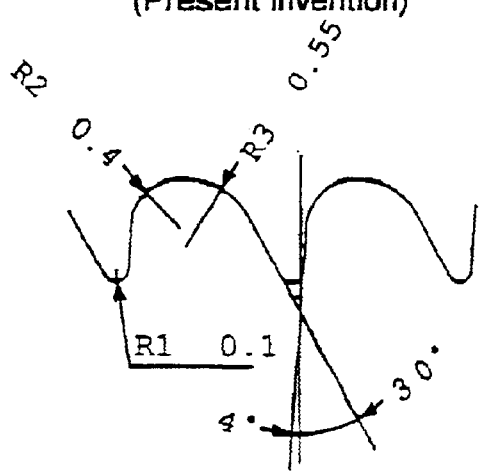
Figure 4:
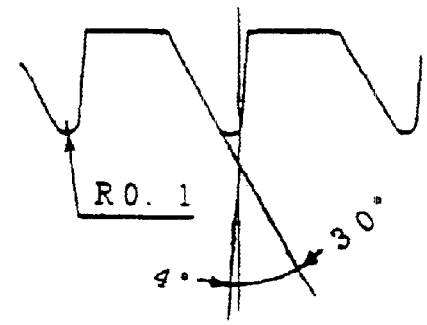
Figure 5:
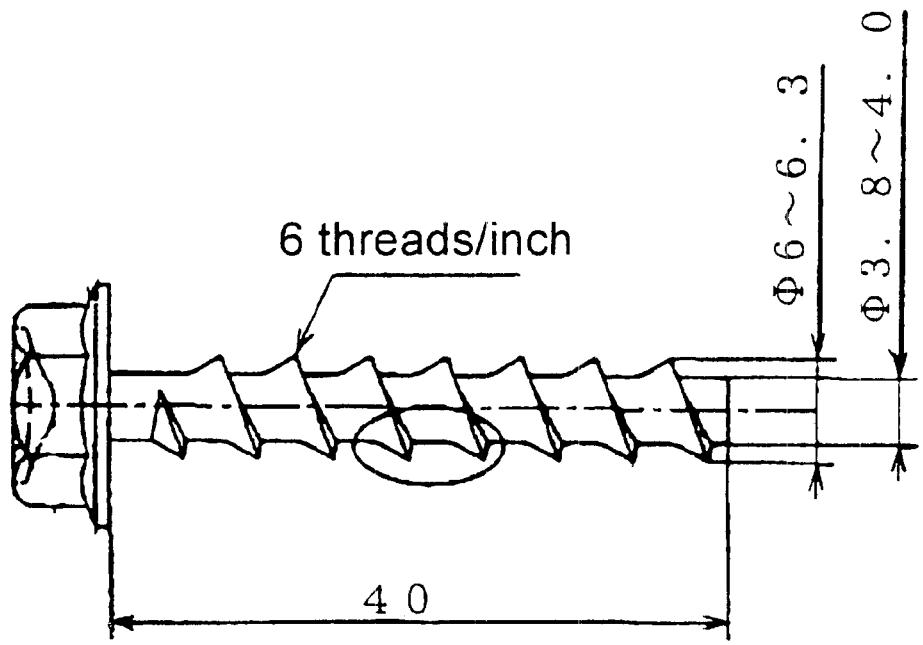
FIG. 5 is a side view of a prior art tapping screw (Prior Art A) used for testing and an enlarged cross-sectional view of the threaded portion.
Figure 5:
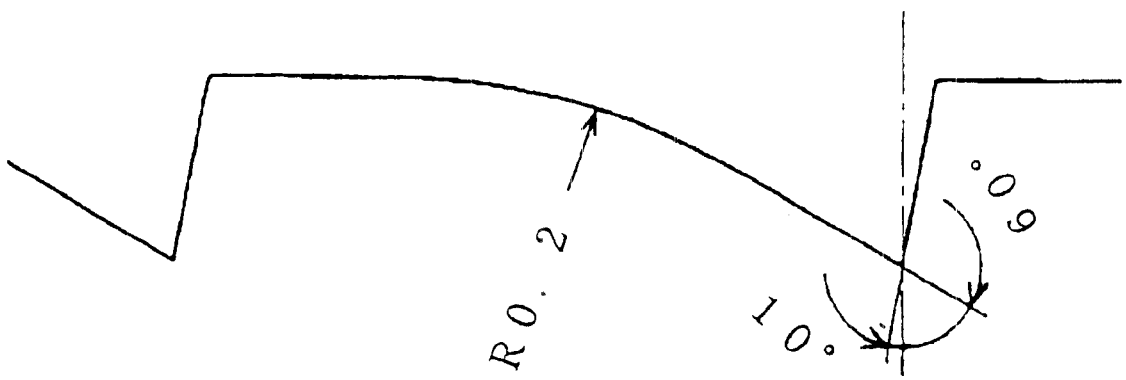
Figure 6:
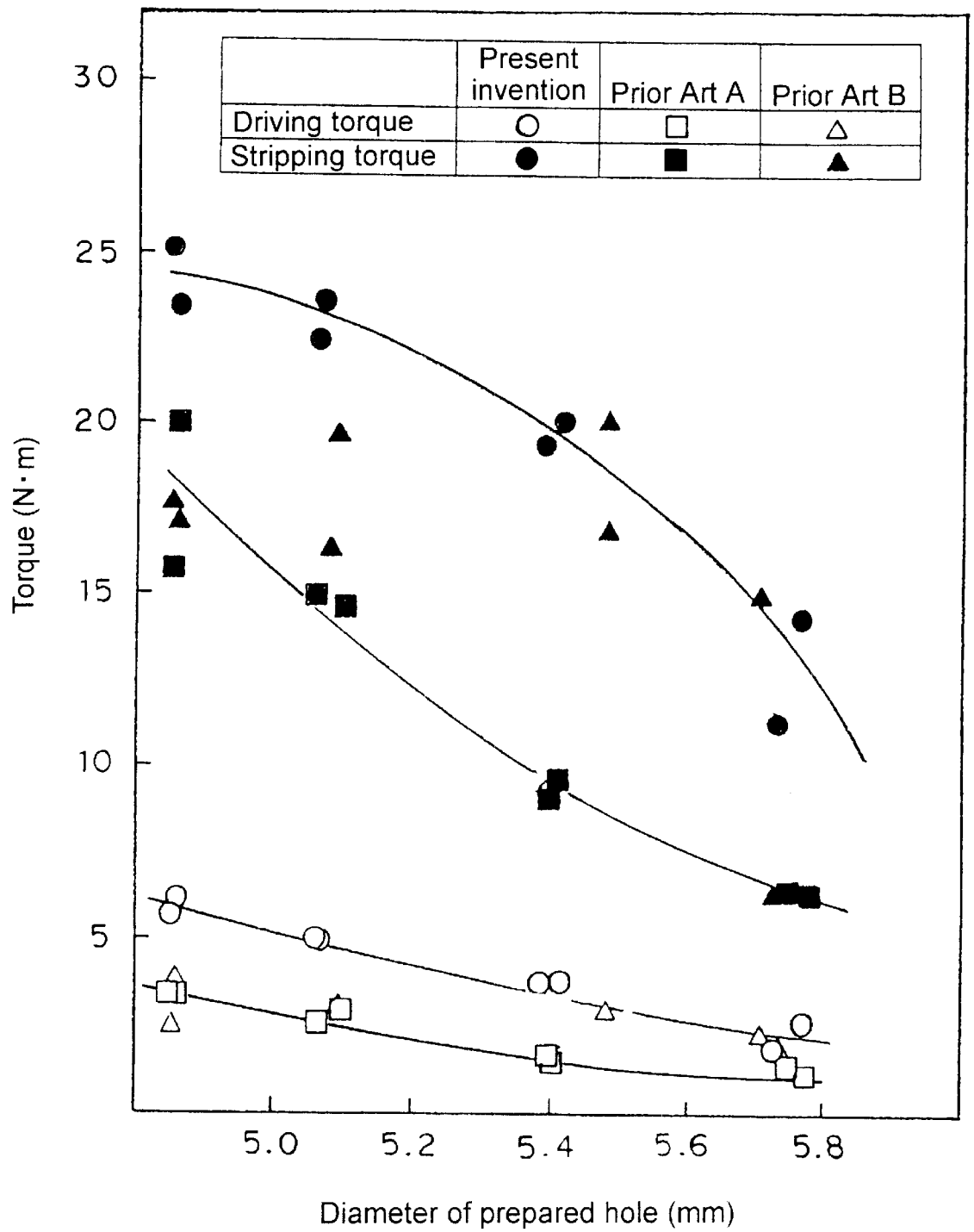
FIG. 6 shows results of comparison test for performance of the tapping screws of the present invention and the prior art (Prior Art A and B)

Performances of Prior Art A tapping screw, simulated to the tapping screw disclosed in Japanese Patent Publication No. 52083/1994 (FIG. 5) and of Prior Art B tapping screw, having the same constitution as that of the present invention, except that the R3 is not formed at the portion of each second flank contiguous to the root thereof (FIG. 4) were compared with that of the tapping screw of the present invention. The results are shown in FIG. 6.

A test was carried out in the following manner:
1) Size of tapping screw: M6
2) Soft material in which an internal thread is cut: 10 mm thick Nylon-6 plate material containing 30% of glass fiber (e.g., 73G30L, Dupont)
3) Measurement item:
Driving torque (the maximum torque in the process of driving) of a tapping screw and stripping torque (the maximum torque in the process of fastening after seating) of the tapping screw were measured for holes previously prepared in the soft material having different diameters.
4) Measuring instrument:
A micro-torque tester (TS-10K), Mori Engineering Co., Ltd., was used. Here, the revolution number of a connecting socket to be engaged with the head 1 of the tapping screw was 10 rpm.

TEST EXAMPLE 2

Figure 7:
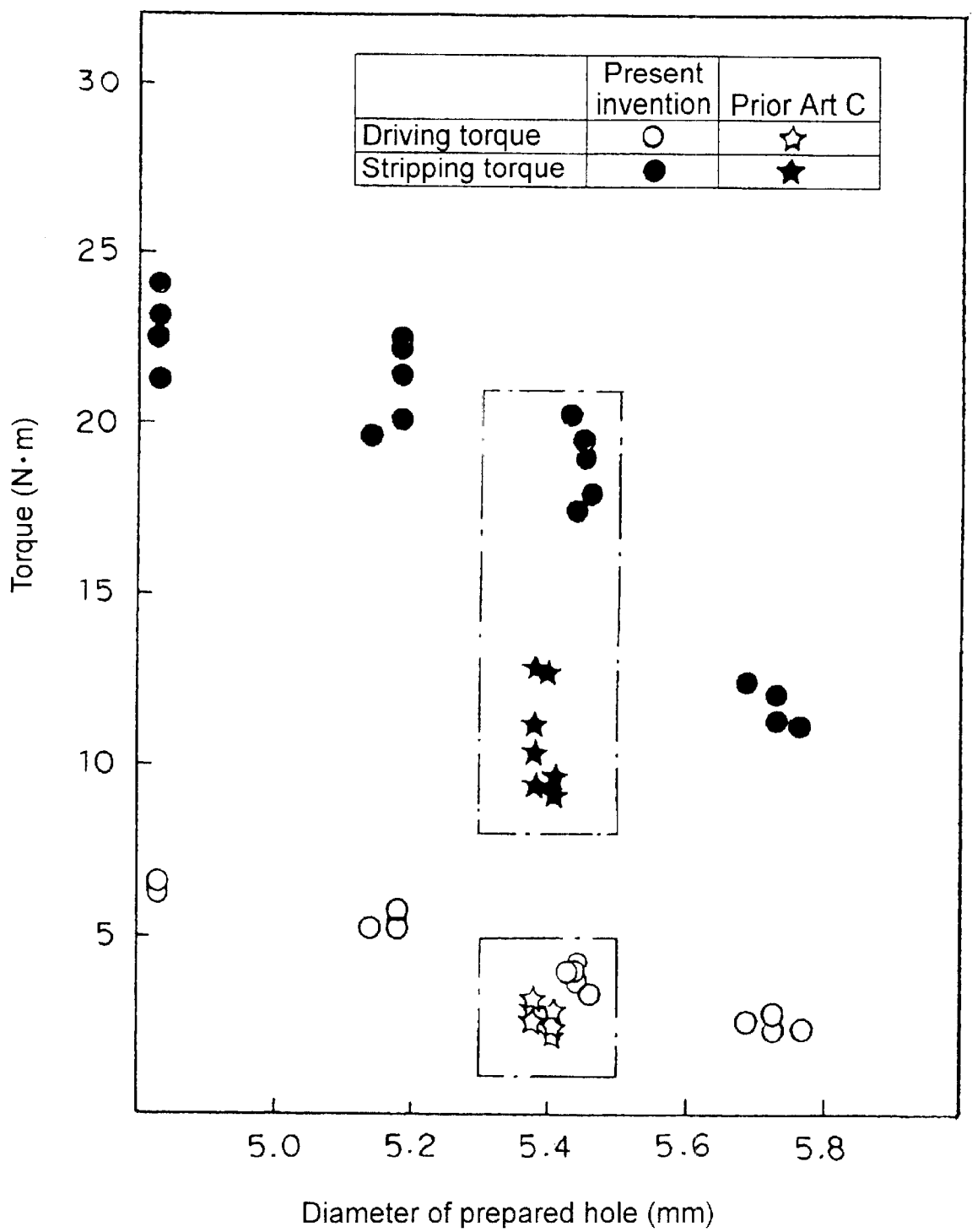
FIG. 7 shows results of comparison test for performance of the tapping screws of the present invention and the prior art (Prior Art C)

A test was carried out in the same manner as in Test Example 1, except that Prior Art C tapping screw was used and that the soft material in which an internal thread is cut on a 20 mm thick plate was used. The results are shown in FIG. 7. Here, the data of Prior Art C tapping screw were measured with respect to prepared holes having fixed diameters of around 5.4 mm, since the main purpose of this test is relative comparison of performance between the tapping screws of the present invention and of the prior art.

Figure 8:
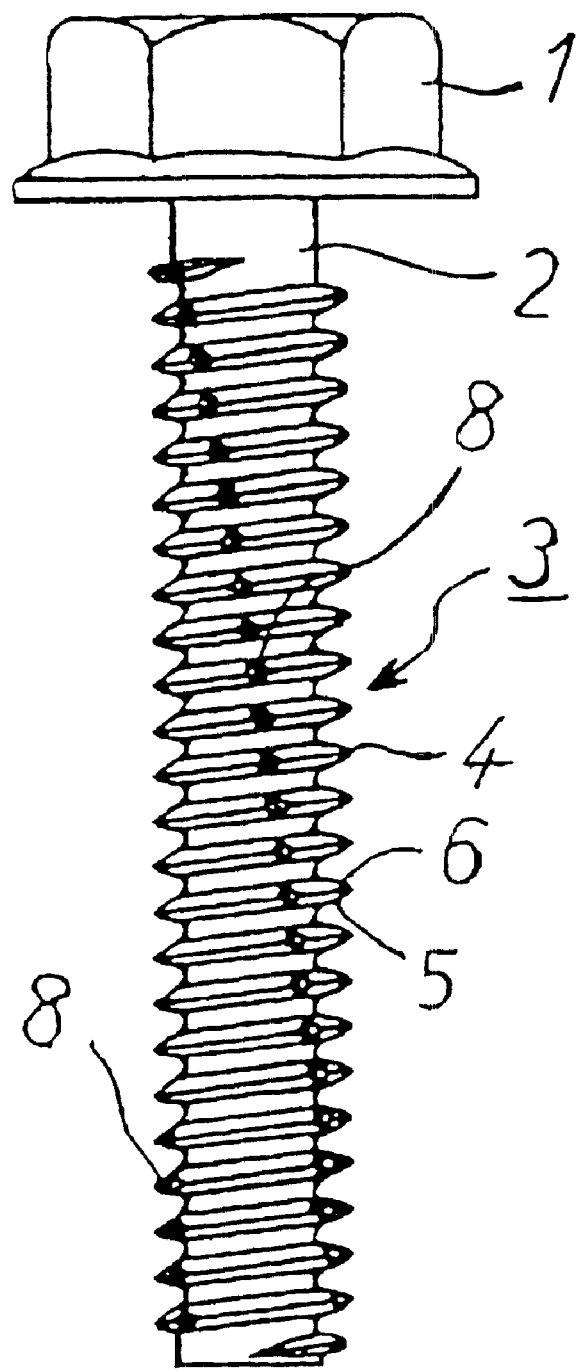
FIG. 8 is a side view showing a tapping screw according to another embodiment of the present invention.

Further, the tapping screw of the present invention may have a suitable number of longitudinal grooves 8 formed on the threaded portion 3 (FIG. 8). These longitudinal grooves 8 also provide clearance or rooms for cutting off the soft material to be scraped off during driving of the tapping screw and contribute to reduction of driving torque. Incidentally, it is advantageous to form these longitudinal grooves 8 perpendicular to the lead angle of the thread in view of their effects.

INDUSTRIAL APPLICABILITY

As described above, since the tapping screw for a soft material of the present invention is invented in terms of configuration of the thread and that of the root, the stripping torque of the tapping screw can be increased sufficiently compared to the same driving torque thereof as those of the prior art tapping screws, and as a result, the tolerance of a fastening torque can be increased to improve fastening workability compared with the prior art tapping screws.

What is claimed is:
1. A tapping screw comprising:
threads and roots, each of the roots being provided between two adjacent ones of the threads, and each of the threads comprising: a leading flank on an advancing side of the tapping screw which faces in a driving direction of the screw at a time of screwing, a following flank on a following side of the tapping screw which faces toward a head of the screw at the time of screwing, and a crest formed by a surface at a top portion of a ridge connecting the leading flank and the following flank,
wherein:
the crest has a convex part,
the leading flank has a concave part between the crest and a next root on the advancing side, the following flank has a concave part between the crest and a next root on the following side, the following flank and the leading flank of the next root on the following side are connected smoothly therebetween at each of the roots, and a following flank angle of the following flank is larger than a leading flank angle of the leading flank in a vicinity of the crest.

2. The tapping screw according to claim 1, wherein the leading flank angle is 0 to 10°, the following flank angle is 20 to 40°, and a sum of the leading flank angle and the following flank angle is 20 to 50°.

3. The tapping screw according to claim 2, wherein longitudinal grooves are formed on a threaded portion perpendicular to a lead angle of each thread.

4. The tapping screw according to claim 1, wherein longitudinal grooves are formed on a threaded portion perpendicular to a lead angle of each thread.

* * * * *